(12) United States Patent
Imanaka et al.

(10) Patent No.: US 6,466,011 B1
(45) Date of Patent: Oct. 15, 2002

(54) TWO-DIMENSIONAL ABSOLUTE POSITION SENSOR

(75) Inventors: Takayuki Imanaka; Satoshi Murakami; Yuji Arinaga; Koji Suzuki, all of Fukuoka (JP)

(73) Assignee: Kabushiki Kaisha Yaskawa Denki, Fukuoka (JP)

( * ) Notice: Subject to any disclaimer, the term of this patent is extended or adjusted under 35 U.S.C. 154(b) by 0 days.

(21) Appl. No.: 09/719,962

(22) PCT Filed: Jun. 18, 1999

(86) PCT No.: PCT/JP99/03284
§ 371 (c)(1),
(2), (4) Date: Feb. 7, 2001

(87) PCT Pub. No.: WO99/66292
PCT Pub. Date: Dec. 23, 1999

(30) Foreign Application Priority Data

Jun. 19, 1998 (JP) ............................................. 10-173455

(51) Int. Cl.[7] .............................. G01B 7/30; G01B 7/00
(52) U.S. Cl. ............................. 324/207.23; 324/207.21; 33/1 M
(58) Field of Search ..................... 324/207.21, 207.23; 702/155; 375/371; 74/471; 33/1 M; 901/46

(56) References Cited

U.S. PATENT DOCUMENTS

| | | | | |
|---|---|---|---|---|
| 5,299,143 A | * | 3/1994 | Hellinga et al. ............. | 364/561 |
| 5,339,030 A | * | 8/1994 | Hayashi .................. | 324/207.23 |
| 5,365,672 A | * | 11/1994 | Kato ......................... | 33/520 |
| 5,412,317 A | * | 5/1995 | Kyoizumi .............. | 324/207.14 |
| 5,461,311 A | * | 10/1995 | Nakazato et al. ...... | 324/207.24 |
| 5,493,216 A | * | 2/1996 | Asa ........................ | 324/207.2 |
| 5,668,331 A | * | 9/1997 | Schintag et al. ........... | 73/865.9 |
| 5,943,639 A | * | 8/1999 | Tanaka et al. .............. | 702/163 |
| 5,970,432 A | * | 10/1999 | Ishimoto et al. ............ | 702/155 |
| 6,031,885 A | * | 2/2000 | Ishimoto et al. ............ | 375/371 |

FOREIGN PATENT DOCUMENTS

| | | |
|---|---|---|
| JP | 1-196585 | 8/1989 |
| JP | 1-269002 | 10/1989 |
| JP | 9-145306 | 6/1997 |

* cited by examiner

Primary Examiner—Edward Lefkowitz
Assistant Examiner—Toan M Le
(74) Attorney, Agent, or Firm—Armstrong, Westerman & Hattori, LLP

(57) ABSTRACT

A two-dimensional absolute position sensor comprises at least one magnetic slit thin plate provided to an end-effector which is attached to the end of a robot arm and moves in a plane, and having slits extending in the X and Y directions, magnetic sensor heads having magnetic sensors for position measurement in the X and Y directions opposed to the magnetic slit thin plate through a gap therebetween and bias magnets for applying magnetic fields to the magnetic sensors, and a signal processing circuit for outputting an absolute position signal generated from signals outputted from the magnetic sensors. Therefore, a small-sized, light-weighted two-dimensional absolute position sensor with an excellent environment-resistance used for readily measuring the two-dimensional absolute position of the end-effector of a robot in a non-contact manner can be provided.

2 Claims, 7 Drawing Sheets

(a)

(b)

TWO-DIMENSIONAL ABSOLUTE POSITION SENSOR

TECHNICAL FIELD

The present invention relates to a two-dimensional absolute position sensor whose non-contact and magnetic features make its environment-resistance excellent and makes it possible to measure the position of a physical object by only installing a small magnetic slit thin plate on the object without making extensive alterations to it, and that can be applied as a position sensor of an end-effector of a clean/vacuum environment robot, and more specifically, a two-dimensional absolute position sensor that can facilitate correction of the position of an end-effector and perform the re-teaching of a robot.

BACKGROUND ART

Conventionally, in the field of semiconductor manufacturing devices, robots that can work in the clean/vacuum environment are generally used to transport silicon wafers and glass substrates for liquid crystal display panels. An end-effector is attached to the end of a robot arm as a movable objects that can hold or carry wafers and glass substrates and operate in a two-dimensional plane.

However, in the case where a certain problem occurs to the above-mentioned robots and it is necessary to re-teach their arms mounted with end-effectors, complicated re-teaching processes require considerable time and cause deterioration of throughput capacity in a subsequent process.

Also, aging loss of resilience of driving belt of robot arm gradually causes shift of end-effector.

To solve the above-mentioned problems and correct shift of end-effector, it is required to attach a small-sized, light-weighted two-dimensional absolute position sensor that does not need to make any extensive improvement to the structure of an end-effector in consideration of the thickness of the end-effector, which is only a few millimeters thick.

Particularly for robots operated in the clean/vacuum environment, generation of particles polluting the environment in which they are operated is not allowable and such robots might sometimes be used in a chemical solution. Position sensors, appropriate for robots operated in the clean/vacuum environment from the above-mentioned aspects, which have an excellent environment-resistance and can readily measure the two-dimensional absolute position of the end-effector in a non-contact manner, have not materialized and no official gazettes setting forth said art have been found.

The present invention is designed to solve the above-mentioned problems and aims at providing a two-dimensional absolute position sensor that can readily measure the two-dimensional absolute position of the end-effector in a non-contact manner if shift of the end-effectors of robots operated in the clean/vacuum environment is observed and that are environment-resistant as well as small-sized and light-weighted.

DISCLOSURE OF THE INVENTION

To solve the above-mentioned problems, the invention in Claim 1 relates to a two-dimensional absolute position sensor that measures the two-dimensional (in the X and Y directions) absolute position of a movable object that is attached to the end of a robot arm and moves in a plane. It comprises at least one magnetic slit thin plate having slits extending in the X and Y directions separately in the plane, where said movable object moves, magnetic sensor heads having magnetic sensors for position measurement in the X and Y directions opposed to the magnetic slit thin plate through a gap therebetween and bias magnets for applying magnetic fields to said magnetic sensor which is opposed to said magnetic slit thin plate through said magnetic sensor, and a signal processing circuit for outputting an absolute position signal generated from signals outputted from said magnetic sensors.

According to Claim 2 of the invention, a two-dimensional absolute position sensor of Claim 1, wherein said signal processing circuit comprises circuits determining an effective region, composed of the first comparator that compares levels of signals having different phases and obtained by one magnetic sensor for position measurement in one of the X and Y directions, amplitude detection circuits that detect the amplitude of signals obtained by the magnetic sensor for position measurement in the other direction, and the second comparator that compares the output of said amplitude detection circuits with a comparison voltage, said two-dimensional absolute position sensor specifies a measured region in one direction, by outputting effective signals of positions generated from the output of said first comparator and said second comparator, and similarly by specifying a measured region in the other direction, and thus a two-dimensional absolute position can be measured.

According to Claim 3 of the invention, a two-dimensional absolute position sensor of Claims 1 and 2, wherein said magnetic slit thin plate is either roughly cross-shaped or T-shaped.

BEST MODE FOR CARRYING OUT THE INVENTION

Figure 1:
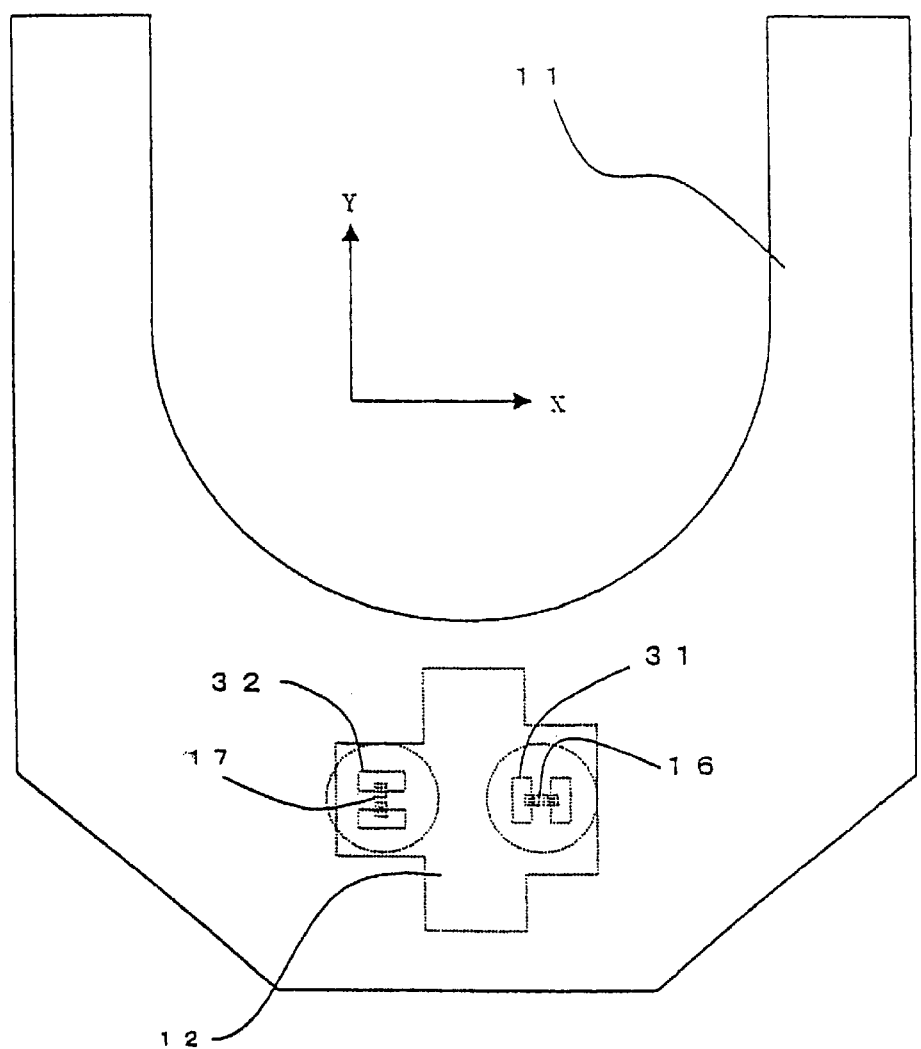
FIG. 1 shows a constitution of a two-dimensional absolute position sensor attached to an end-effector, which is an embodiment of the present invention, and FIG. 1(*a*) shows its top plan view and FIG. 1(*b*) shows its side view.
Figure 1:
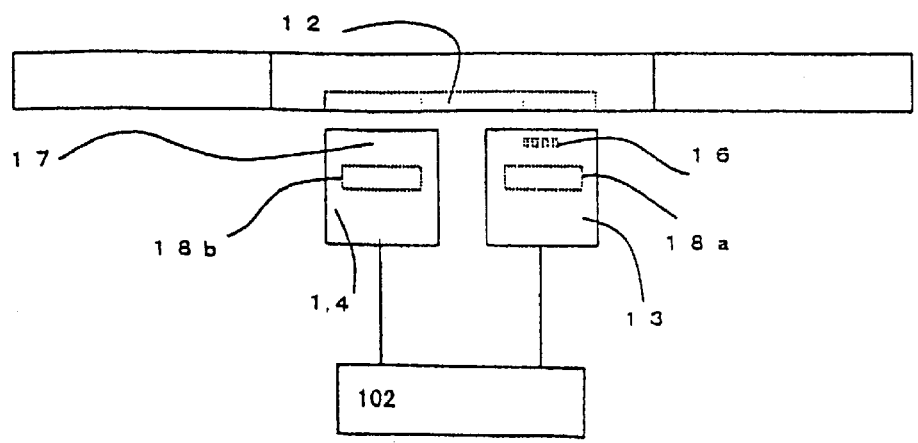

An embodiment of the invention is explained with reference to the drawings. FIG. 1 shows a constitution of a two-dimensional absolute position sensor attached to an end-effector, which is an embodiment of the present invention, and FIG. 1(a) shows its top plan view and (b) shows its side view. In the drawings, 11 is an end-effector mounted to a robot that is operated in the clean/vacuum environment, and 12 is a magnetic slit thin plate. 13 is an X-position measuring magnetic sensor head, and 14 is a Y-position measuring magnetic sensor head. The X-position measuring magnetic sensor head 13 and the Y-position measuring magnetic sensor head 14 respectively have magnetic sensors 16 and 17, bias magnets 18a and 18b, and a basic detection circuit described below. Here, the basic detection circuit converts a change in the values of electric resistance of each of the magnetic sensors 16 and 17 into a voltage signal. In FIG. 1(b), 102 is a signal processing circuit.

Figure 2A:
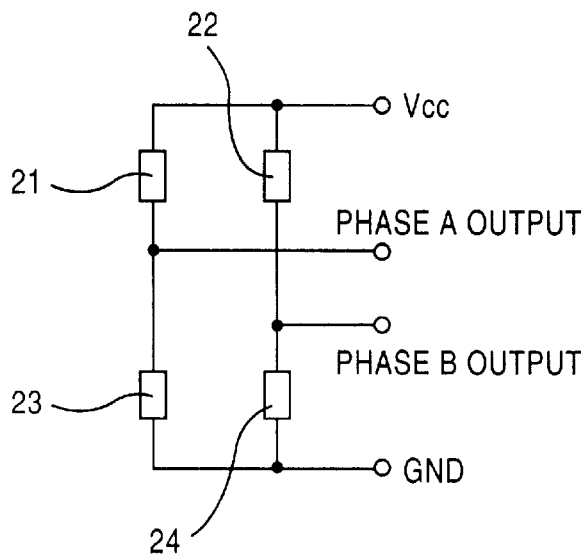
FIG. 2 illustrates a basic detection circuit mounted in a magnetic sensor head and FIG. 2(*a*) shows a circuit diagram of the basic detection circuit and FIG. 2(*b*) shows a layout plan of MR elements.
Figure 2B:
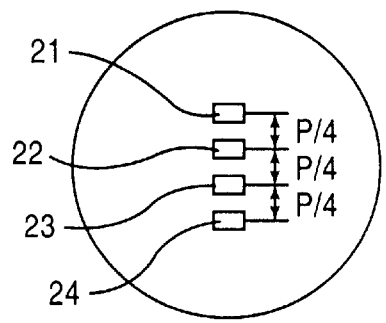

FIG. 2 is an explanatory drawing of the basic detection circuits mounted in the magnetic sensor heads and FIG. 2(a) shows a circuit diagram of the basic detection circuit and (b) shows a layout plan of MR elements. MR elements from 21 through 24 are arranged at P/4 pitch intervals inside each of the magnetic sensor heads 13 and 14 when a slit pitch interval of the magnetic slit thin plate is set to be P. The magnetic slit thin plate 12 is attached to the base of the end-effector 11 and opposed through a-few-millimeter-wide gap therebetween to the magnetic sensor heads 13 and 14.

Figure 3:
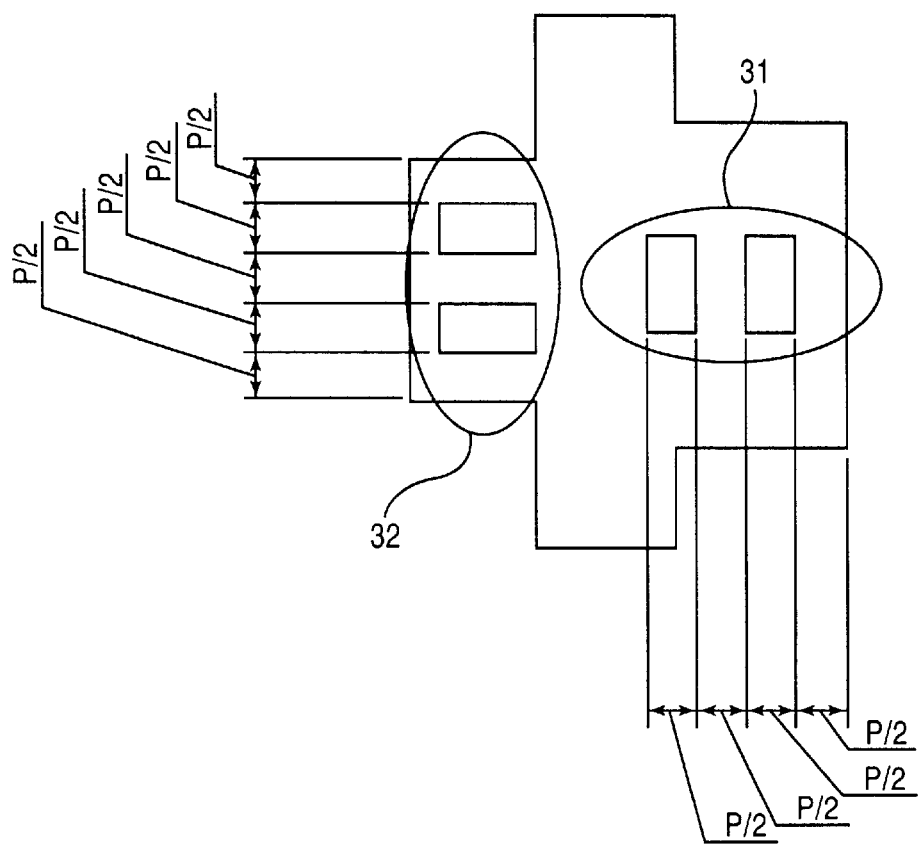
FIG. 3 is an outline drawing of a magnetic slit thin plate.

FIG. 3 is an outline drawing of the magnetic slit thin plate 12. The magnetic slit thin plate 12 is roughly cross-shaped and made of magnetic materials such as silicon steel sheets. In the drawing, 31 illustrates an X-position measuring slit and 32 illustrates a Y-position measuring slit, and these slits are formed by methods including etching.

Figure 4:
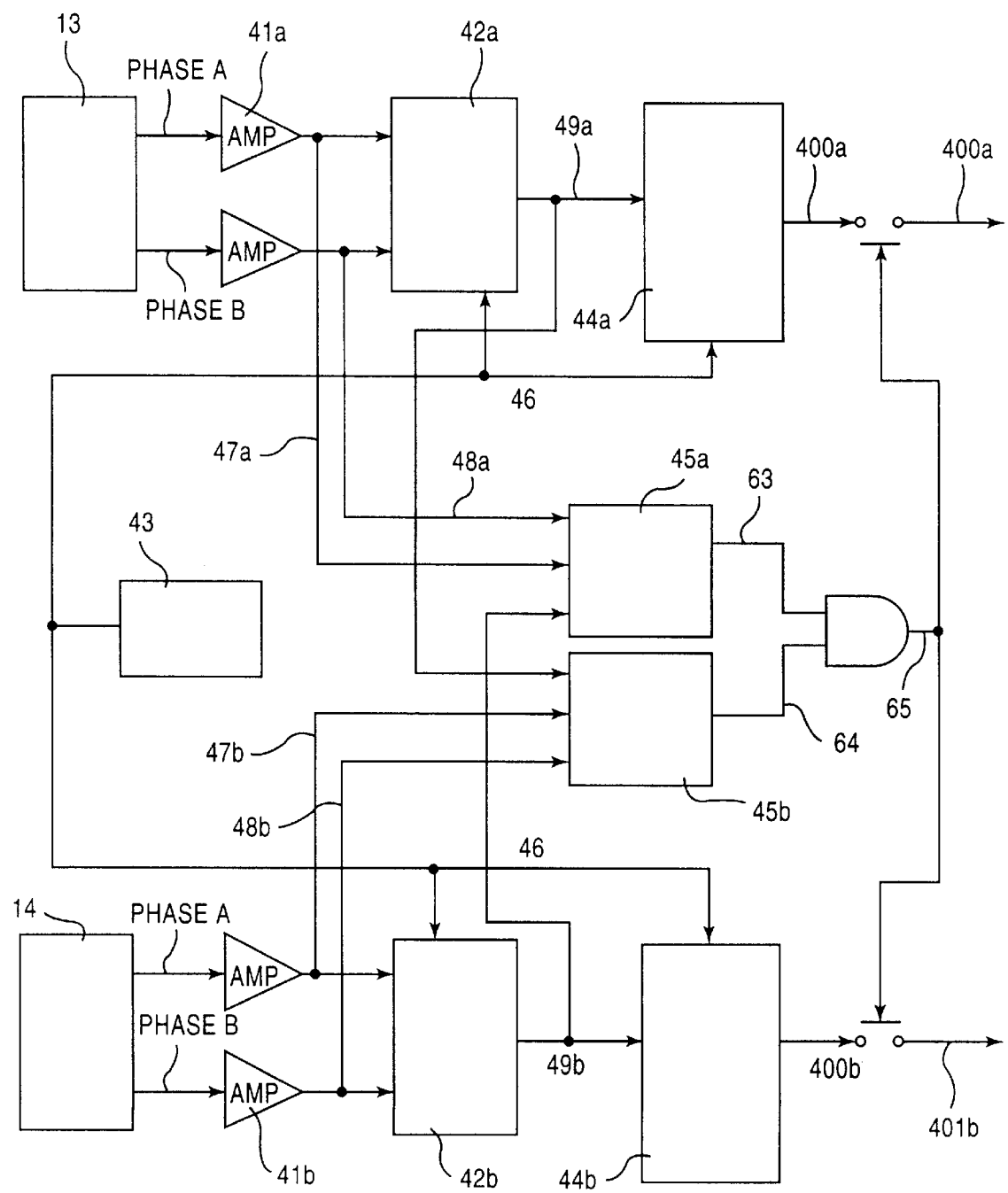
FIG. 4 is a block diagram showing a signal processing circuit.

Next, detection of two-dimensional (in the X and Y directions) absolute position signals will be explained. FIG. 4 is a block diagram of the signal processing circuit for measuring both of X- and Y-positions. Here, explanation is given with the signal processing circuit for measuring an X position as an example. When the X-position measuring slit 31 on the magnetic slit thin plate 12 goes over the X-position measuring magnetic sensor 16, the existence of the slit changes the magnetic flux and eventually changes the values of electric resistance of the magnetic sensor 16. After this change in the values of electric resistance is converted into voltage signals of phases A and B, which are out of phase 90 degrees, in the basic detection circuit shown in FIG. 2 and each signal is amplified by an amplifier 41a, the phases of the signals are modulated in a phase modulation circuit 42a. Here, if a shift value of the magnetic slit thin plate is represented by x, and a phase A signal VA and a phase B signal VB are respectively expressed as $$V_A = V_0 \sin(2\pi \cdot x/P) \quad (1)$$

$$V_B = V_0 \cos(2\pi \cdot x/P) \quad (2),$$

phase modulation is obtained by balance-modulating and adding carrier waves, $V_1 \sin \omega t$ and $V_1 \cos \omega t$, whose amplitudes are, respectively, $V_1$, and angular frequencies are, respectively, $\omega t$. A modulated signal S is expressed as follows.

$$S = V_0 V_1 \sin(2\pi \cdot x/P)\sin\omega t + V_0 V_1 \cos(2\pi \cdot x/P)\cos\omega t =$$
$$(V_0 V_1/2)\{(\cos(\omega t - 2\pi \cdot x/P) - \cos(\omega t + 2\pi \cdot x/P)$$
$$\cdot x/P) + \cos(\omega t - 2\pi \cdot x/P) + \cos(\omega t + 2\pi \cdot x/P)\}$$
$$= V_0 V_1 \cos(\omega t - 2\pi \cdot x/P) \quad (3)$$

In other words, by balance-modulating and adding voltage signals of phases A and B by the carrier waves whose angular frequency is 107 t, the phase of the modulated signal S changes by $2\pi \cdot x/P$ if a shift x occurs. Therefore, by comparing a phase modulation signal 49a obtained in the phase modulation circuit 42a with a reference signal for phase modulation 46 outputted from a circuit generating a reference signal for phase modulation 43 in the phase difference detection circuit 44a, and detecting phase difference, an X position signal 400a is outputted.

Figure 5:
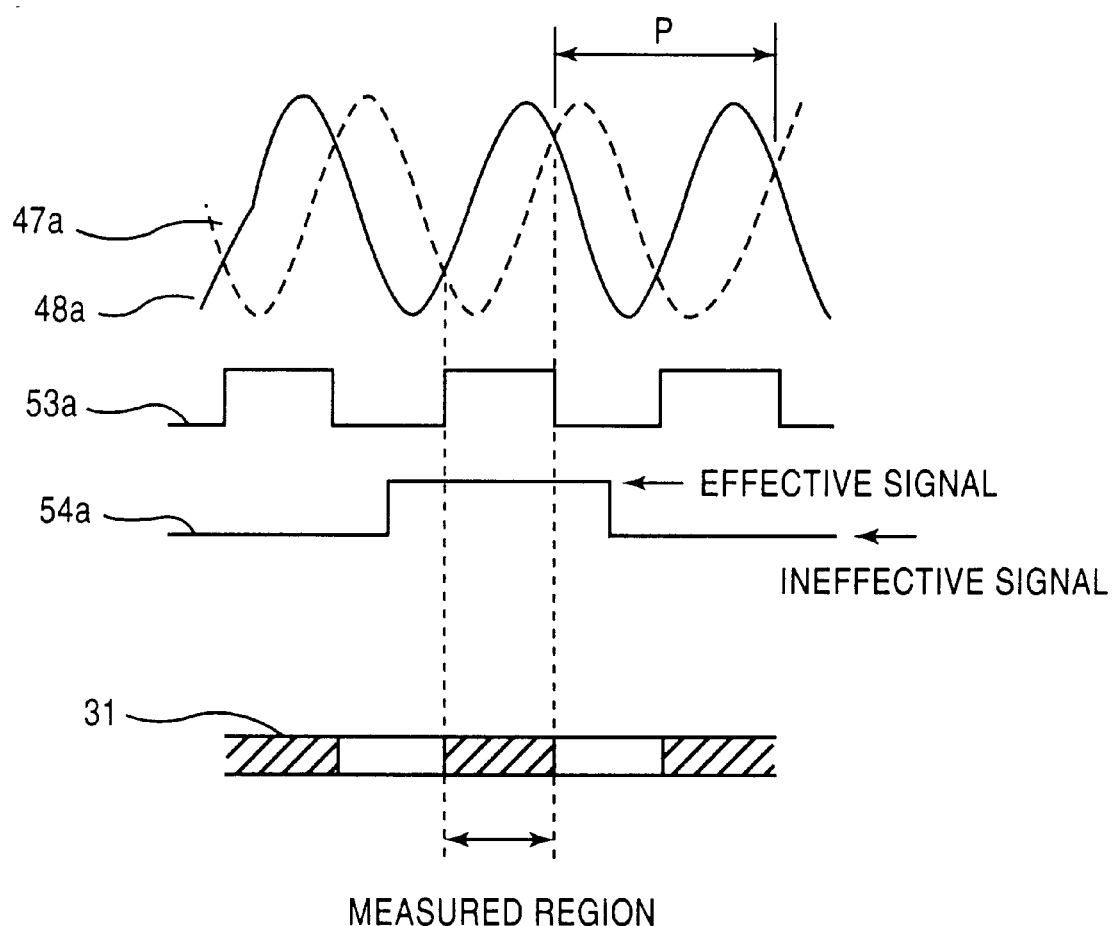
FIG. 5 is an explanation drawing showing a relation between a slit position and a signal output for X position measurement.

However, as shown by the relationship between the positions of the X-position measuring slit and the output of signals in FIG. 5, phase A amplification signals 47a and phase B amplification signals 48a are repeatedly observed over a few slits, and if nothing is provided here, a measured region cannot be specified. Accordingly, as shown in the same drawing, a circuit determining an effective region of X-position 45a is added, which generates a B>A signal 53a if the phase B amplification signal 48a is larger than the phase A amplification signal 47a, and generates a signal determining an effective region of X position 54a and can specify one measured region. Here, the B>A signal 53a can be replaced by a B<A signal that represents that the phase A amplification signal 47a is larger than the phase B amplification signal 48a.

Figure 6:
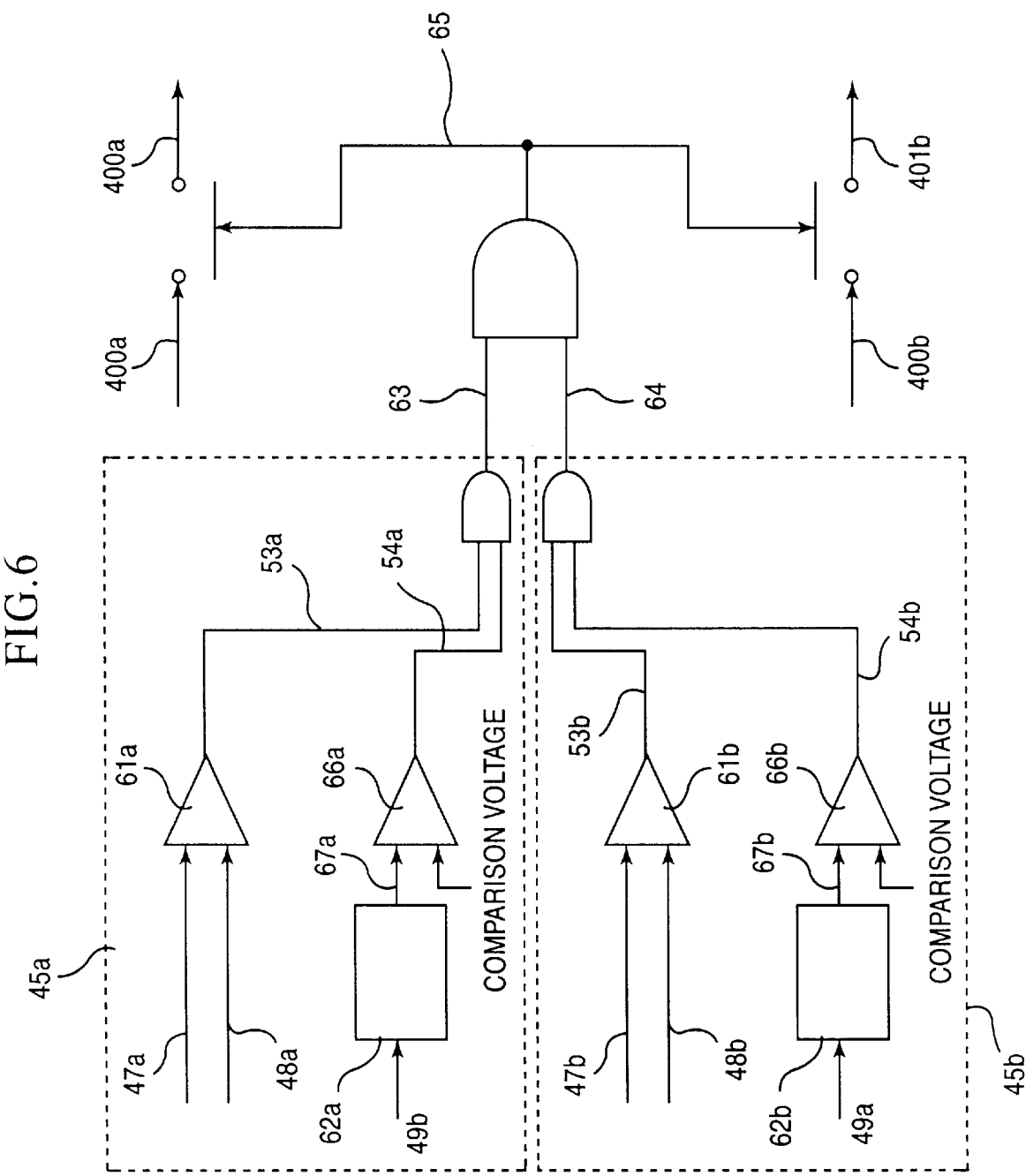
FIG. 6 is a block diagram showing a circuit determining an effective region.

FIG. 6 illustrates a circuit determining an effective region of the positions. In a circuit determining an effective region of X position 45a, 61a is a comparator that compares the size of the phase A amplification signal 47a and the phase B amplification signal 48a of the x-position measuring magnetic sensor 16, and 62a is an amplitude detection circuit that detects the amplitude of signals obtained by the Y-position measuring magnetic sensor 17, and used as a peak hold circuit that holds a peak of a phase modulation signal 49b. 66a is a comparator that compares a peak hold signal of the peak hold circuit 62a and comparison voltage. Here, the peak hold circuits are not limited to the said circuit as long as they can detect the amplitude of signals obtained by the magnetic sensors.

If the density of a magnetic flux that passes through four MR elements composing the Y-position measuring magnetic sensor 17 greatly varies, the phase modulation signal 49b obtained by the Y-position measuring magnetic sensor 17 has a larger amplitude, and conversely, if the density of a magnetic flux that passes through the four MR elements is not much different, such amplitude becomes smaller. Specifically when the Y-position measuring slits 32 are located over the Y-position measuring magnetic sensor 17, the amplitude of the phase modulation signal 49b becomes larger and accordingly, a peak hold signal for phase modulation 67a, whose peak is held by the peak hold circuit 62a, becomes larger than the comparison voltage of the comparator 66a and a signal determining an effective region of X position 54a turns out to be an effective signal.

On the contrary, when the Y-position measuring slits 32 are not located over the Y-position measuring magnetic sensor 17, the amplitude of the signal of phase modulation 49b becomes smaller. Accordingly, a peak hold signal for phase modulation 67a, whose peak is held by the peak hold circuit 62a, becomes smaller than the comparison voltage of the comparator 66a and the signal determining an effective region of X position 54a turns out to be an ineffective signal. If a product of the signal determining an effective region of X position 54a and the B>A signal 53a is obtained, an effective signal of X position 63 is generated and an effective region of X position can be determined.

Explanation of the X-position measuring signal processing circuit is given above, and the Y-position measuring signal processing circuit has the same constitution.

Accordingly, in this embodiment, the two-dimensional absolute position sensor comprises at least one magnetic slit thin plate provided to an end-effector and having slits extending in the X and Y directions, magnetic sensors for position measurement in the X and Y directions opposed to the magnetic slit thin plate through a gap therebetween, and a signal processing circuit for outputting an absolute position signal generated from signals outputted from the magnetic sensors, and the signal processing circuit has circuits determining effective regions of X and Y positions. Therefore, a region where the circuits determining effective regions of X and Y positions output effective signals of X and Y positions simultaneously can only exist at one point in an unlimited plane. Namely, by monitoring an effective signal, which is a product of an effective signal of X position and an effective signal of Y position, a measured region can be limited to one.

Figure 7:
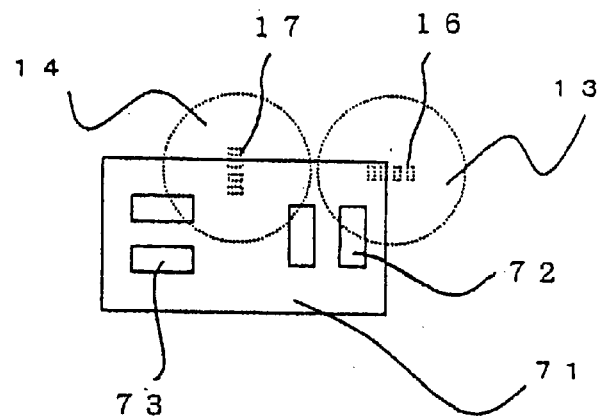
FIG. 7 is a layout plan showing a positional relation between a magnetic slit thin plate and a sensor head in the case where an effective signal is outputted outside a proper measured region.

If a magnetic slit thin plate 71 shown in FIG. 7 is used and the magnetic sensor head is located at the edge of the magnetic slit thin plate, the B>A signals 53a and 53b as well as signals determining effective regions of X and Y positions 54a and 54b are outputted by the circuits determining effective regions of X and Y positions 45a and 45b although the magnetic sensor heads 13 and 14 are not located over the slits 72 and 73, respectively. As a result, an effective signal 65 is outputted and a position is measured outside a proper measured region, that is, off the slits 72 and 73. In comparison with a magnetic slit thin plate shown in FIG. 7, in a cross-shaped magnetic slit thin plate shown in FIG. 3 of this embodiment, despite the output of an effective signal of one position, an effective signal of the other position is never outputted outside the proper measured region. Subsequently, the effective signal 65 is not outputted and no falsely recognized regions exist. Accordingly, existence of such falsely recognized regions could be avoided.

Figure 8:
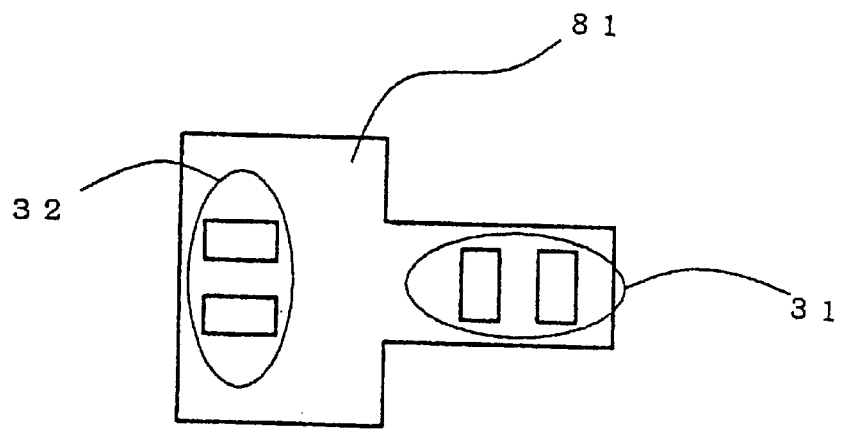
FIG. 8 is an outline drawing of a T-shaped magnetic slit thin plate.

Regarding the outer shape of the slit thin plates, an example of a roughly cross-shaped sheet is cited in this embodiment, but as long as the plates are in shapes that do not allow the existence of falsely recognized regions, any shape could be admissible and the shape of the plate is not limited to a cross-shape. As an example, if only one magnetic slit thin plate is used for position measurement, a plate in a roughly T-shaped, as shown in FIG. 8 can also be used.

Figure 9:
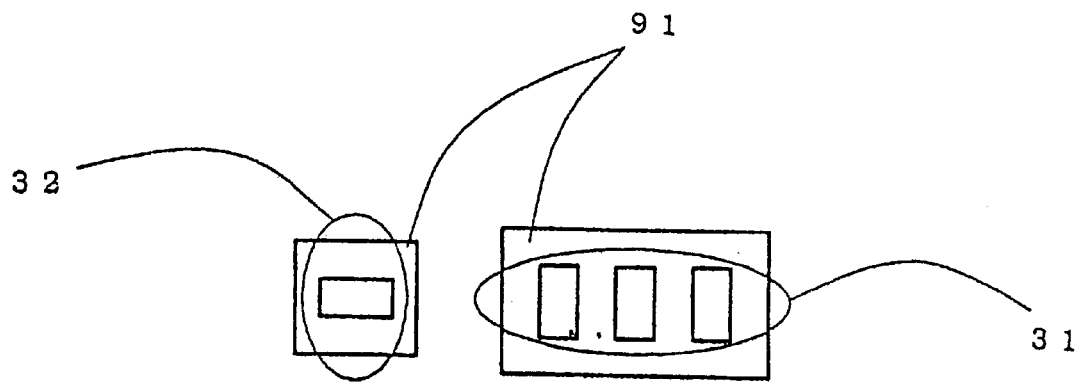
FIG. 9 is an outline drawing of a rectangular magnetic slit thin plate.
Figure 10:
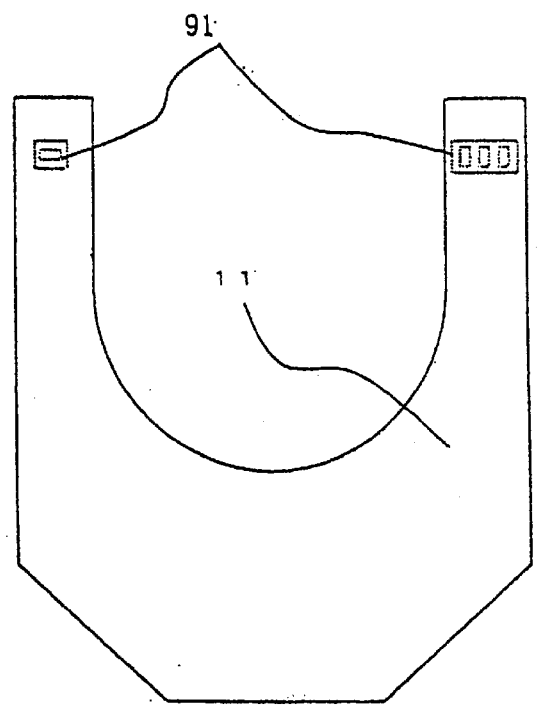
FIG. 10 is an outline drawing of an end-effector having a rectangular magnetic slit thin plate.

The X- and Y-position measuring slits can be separated and arranged in two magnetic slit thin plates and in that case, rectangular magnetic slit thin plates shown in FIG. 9 can also be used. If the magnetic slit thin plates are attached to the base of an end-effector, roughly cross-shaped or T-shaped slit thin plates are preferable and if they are attached to the end of the end-effector, shown in FIG. 10, rectangular magnetic slit thin plates 91 are preferable.

As explained above, by adding the circuits determining effective regions 45a and 45b and choosing cross-shaped thin plates, only the region P/2 is judged to be effective in an unlimited plane and an absolute position within the region can be measured and used for correcting the positions.

Finally, an explanation is given as to methods of correcting positions and re-teaching of end-effectors of clean/vacuum environment robots.

First, an explanation is given as to a method of correcting positions of end-effectors of clean/vacuum environment robots.

Figure 11:
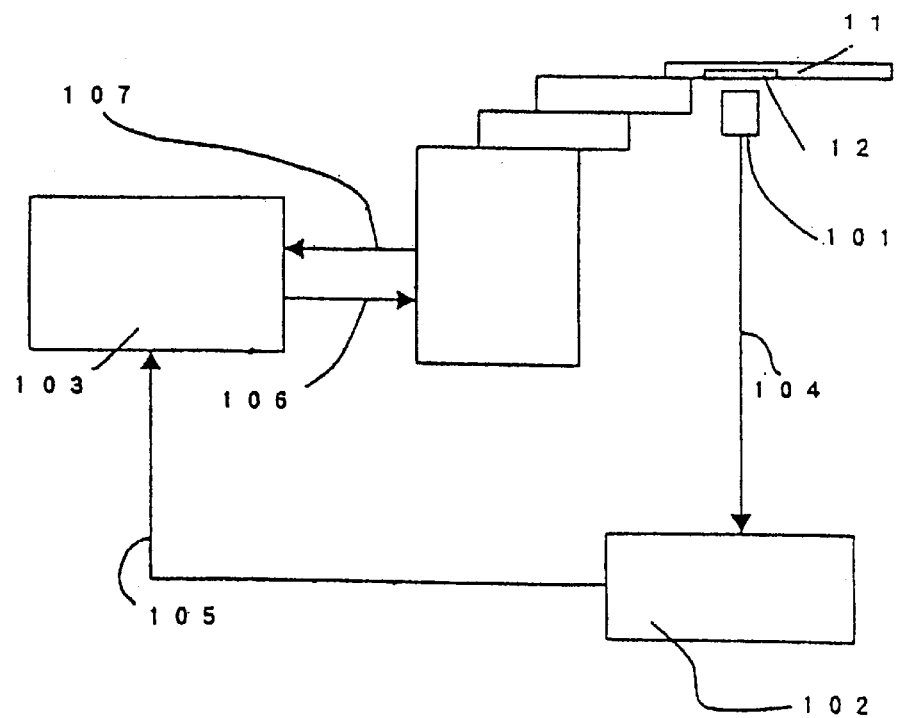
FIG. 11 is an illustration showing a constitution of a position correction system of a clean/vacuum environment robot.

FIG. 11 shows a constitution of a position correction system of clean/vacuum environment robots.

In the drawing, a magnetic sensor head 101 is arranged so that the end-effector 11 of clean/vacuum environment robot is opposed to the magnetic slit thin plate 12 at a system origin position of measurement. Here, a system origin position means a reference point for the operation of a robot and is to exist within a measured region of the two-dimensional absolute position sensor. A two-dimensional absolute position signal for an end-effector 105 at the system origin position is fed back 104 to an upper controller including a robot controller 103. Accordingly this feedback signal makes it possible to obtain a value of shift from the system origin position of the end-effector and based on such a value, positions can be corrected. In FIG. 11, 104 is a sensor signal of phases A and B, 106 is a command signal and 107 is a respective angle position signal.

Next re-teaching is explained.

Since the position sensor of this invention provides absolute values, it is possible to obtain a shift value between any arbitrary point and said system origin position within the measured region. Therefore, if a clean/vacuum environment robot needs to be exchanged or replaced, or re-teaching is required for a certain reason, the robot can return to said system origin position only by moving the end-effector 11 to any arbitrary point within the measured region of the two-dimensional absolute position sensor, and re-teaching in connection with a teaching point other than the system origin position can be omitted by making the controller 103 memorize a teaching point from the system origin position at the time of the first teaching. Completion of re-teaching needs only to move the end-effector 11 within the measured region of the two-dimensional absolute sensor and the time required for such procedure is shortened to a large degree.

INDUSTRIAL APPLICABILITY

As explained above, the two-dimensional absolute position sensor of the present invention is useful, for instance, as a means of measuring the two-dimensional absolute position of the end-effector of a robot operated in the clean/vacuum environment.

What is claimed is:

1. A two-dimensional absolute position sensor that measures the two-dimensional absolute position (in the X and Y directions) of a movable object which is attached to the end of a robot arm and moves in a plane, and that comprises;

at least one magnetic slit thin plate having slits extending in the X and Y directions separately in the plane where said movable object moves, magnetic sensor heads having magnetic sensors for position measurement in the X and Y directions opposed to the magnetic slit thin plate through a gap therebetween and bias magnets for applying magnetic fields to said magnetic sensor opposed to said magnetic slit thin plate through said magnetic sensor, and a signal processing circuit for outputting an absolute position signal generated from signals outputted from said magnetic sensors, wherein said signal processing circuit comprises circuits determining an effective region, composed of the first comparator which compares levels of signal having different phases obtained by the magnetic sensor for position measurement in one of the X and Y directions, amplitude detection circuits that detect the amplitude of signals obtained by the magnetic sensor for position measurement in the other direction, and the second comparator that compares the output of said amplitude detection circuits with a comparison voltage, and said two-dimensional absolute position sensor specifies a measured region in one direction, by outputting effective position signals generated from the output of said first comparator and said second comparator, and similarly by specifying a measured region in the other direction, and thus a two-dimensional absolute position can be measured.

2. A two-dimensional absolute position sensor according to claim 1, wherein said magnetic slit thin plate is roughly cross-shaped or T-shaped.

* * * * *